United States Patent Office 2,834,764
Patented May 13, 1958

2,834,764
POLYMERIZATION PROCESS EMPLOYING N-SUB-STITUTED-BENZOSULFOTRIAZINE POLYMERIZATION CATALYSTS

Walter M. Thomas, Noroton Heights, and Frank A. V. Sullivan, Glenbrook, Conn., assignors to American Cyanamid Company, New York, N. Y., a corporation of Maine No Drawing. Application December 14, 1954
Serial No. 475,291

15 Claims. (Cl. 260—85.5)

This invention relates to the addition polymerization of polymerizable ethylenically unsaturated compounds. More particularly, this invention relates to novel polymerization catalysts useful in the polymerization of ethylenically unsaturated compounds.

Ethylenically unsaturated polymerizable compounds may be polymerized by a number of different reactions. Thus, for example, techniques such as bulk, bead, solution and emulsion polymerization have been practiced in the past. In each instance it is usually desirable to add a polymerization catalyst to the materials being polymerized in order to expedite the reaction. Heat and light, as well as X-ray or gamma ray radiation, may also be employed in combination with the polymerization catalyst if desired.

It is believed that during a free radical polymerization reaction a free radical formed by the decomposition of the catalyst reacts with the monomers present and initiates polymerization. The organic peroxide and azo type catalyst are well known for this purpose. However, in certain instances, as for example in the presence of various compounds which may be present in either the monomers, solvents or modifiers, the peroxide catalysts are sometimes ineffective initiators for the polymerization reaction. In accordance with the present invention, a novel polymerization catalyst has been found that is useful in the polymerization of ethylenically unsaturated compounds.

It is therefore an object of our invention to polymerize polymerizable ethylenically unsaturated compounds. It is a further object of our invention to polymerize polymerizable ethylenically unsaturated compounds in the presence of a novel polymerization catalyst. These and other objects of our invention will be discussed more fully hereinbelow.

It has now been found that addition polymerization reactions may be carried out utilizing as the polymerization catalyst various N-substituted-benzosulfotriazines. These compounds may be represented by the general formula

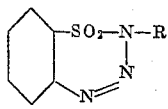

wherein R is selected from the group consisting of alkyl radicals of from 1 to 6 carbon atoms, aryl radicals of from 6 to 12 carbon atoms, aralkyl radicals, cycloalkyl radicals and chloro- and hydroxy-derivatives of such radicals. In this general formula the alkyl radicals are such as methyl, ethyl, isopropyl, tertiary-butyl and the like; the aryl radical is such as phenyl, naphthyl and the like; the aralkyl radical is such as benzyl, phenyl ethyl and the like; the cycloalkyl radical is such as cyclobutyl, cyclohexyl and the like; the chloro- and hydroxy-substituted derivatives of these radicals are such as hydroxyethyl, chlorophenyl and the like. In certain instances when the N,N'-alkylenebis-benzosulfotriazines are available they may also be employed as the polymerization catalyst in similar processes.

The benzosulfotriazines herein employed may be readily prepared by diazotizing, in the usual manner, the appropriate N-substituted-2-aminobenzosulfonamide. Upon completion of the diazotization reaction, the diazonium solution is poured into water with stirring. The product separates rapidly as crystals which may be recovered in any manner, such as by filtration, washed with water and dried. It has previously been believed that such compounds were quite stable to both dry and wet heat and that it was possible to heat these products to their melting point with little, if any, decomposition. It is therefore surprising that these compounds have been found to be excellent polymerization catalysts in accordance with this invention, since the addition polymerization reaction may be carried out at temperatures well below the decomposition point of said materials.

Polymerizable ethylenically unsaturated compounds that may be polymerized in accordance with the present invention are well known. Thus, for example, the styrene comopnds represented by the general formula

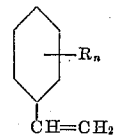

wherein R is a lower alkyl radical of from 1 to 2 carbon atoms and $n$ is an integer of from 0 to 2 may be polymerized herein. Compounds of this nature are such as styrene per se, methylstyrene, dimethylstyrene, ethylstyrene, diethylstyrene and the like. The halo-substituted styrenes may also be polymerized. Other ethylenically unsaturated compounds that are subject to polymerization and copolymerization in accordance with this invention are such as acrylyl and alkacrylyl compounds, e. g., acrylonitrile, methyl acrylate, ethyl methacrylate, methacrylic acid, acrylamide, methacrylamide, etc.; vinyl and vinylidene halides, e. g., vinyl fluoride, vinylidene chloride, etc.; vinyl carboxylates, e. g., vinyl acetate, vinyl trimethylacetate and the like; vinyl imides, e. g., N-vinylphthalimide. In addition to the polymerization of the compounds listed hereinabove, compounds having more than a single unit of ethylenic unsaturation are also polymerizable in accordance with this invention. These compounds include such as the polymerizable ethylenically unsaturated polycarboxylic acid-polyhydroxy alcohol polyesters. This includes the polymerization of fumaric and maleic polyesters with compounds containing a polymerizable $CH_2=C<$ group and having a boiling point of at least 60° C. The term polymerization as used herein is intended to include within its scope, in addition to the polymerization of a monomer alone, copolymerization, e. g., the polymerization of two or more of the monomers. Thus the present invention includes, for example, copolymers obtained by polymerizing acrylonitrile and the above-mentioned styrene compounds, i. e. those represented by the general formula

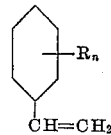

wherein R is a lower alkyl radical of from 1 to 2 carbon atoms and $n$ is an integer of from 0 to 2. The present invention is applicable to the polymerization of any monoethylenically unsaturated compound which has been polymerized by an addition polymerization as practiced in the prior art. Optimum polymerization conditions may vary from monomer to monomer but may be easily determined by those skilled in the art.

In order that those skilled in the art may more fully understand the inventive concept herein presented, the following examples are given by way of illustration and not limitation unless otherwise noted in the appended claims. All parts are parts by weight.

*Example 1*

A heavy-wall reactor with a constricted neck was charged with 4 parts of purified acrylonitrile and a quantity of a benzosulfotriazine sufficient to make a 0.05 molar solution at 25° C. The reactor was cooled in acetone and Dry Ice, evacuated at 1 to 2 millimeters mercury and sealed. The reactor was heated as indicated below, then cooled and opened. The polymer was filtered, washed with hot benzene, air dried, then dried for 3 hours at 60° C. and weighed. The results are set forth in the following table:

| Benzosulfotriazine | Amount Used | Polymer Conditions | | Percent Polymer |
|---|---|---|---|---|
| | | Minutes | °C. | |
| None | | 60 | 80 | None |
| N-methyl | 0.0492 | 15 | 85 | 5 |
| N-phenyl | 0.0647 | 75 | 40 | 3.5 |
| N,N'-ethylenebis | 0.0980 | 30 | 85 | 11.5 |

*Example 2*

A mixture of 0.05 part of N-phenyl-benzosulfotriazine and 5 parts of purified styrene were heated for 2½ hours at 90° C. A large yield of polystyrene was obtained by precipitation in excess methanol and drying.

The catalyst herein employed should be present during the polymerization reaction in a catalytic amount. The amount of the catalyst necessary will vary according to the particular monomers being polymerized. Generally, amounts from as little as 0.05% up to about 5% by weight, based on the total weight of monomers, of the catalyst may be used. It is preferred that the amount of the catalyst present be within the order of from about 0.1% to about 3% of the monomers. The temperature employed during the polymerization reaction will also depend upon the particular polymerization recipe. It is preferred that the polymerization temperature be within the range of from about 35° C. up to about 120° C. In certain instances temperatures falling outside of this range may be employed but generally this temperature range is satisfactory for the production of the polymeric materials.

As previously indicated, the novel catalyst used in accordance with the present invention may be added to the monomers which may be polymerized in accordance with any processes known in the prior art. If desired, lubricants, dyes, pigments and other modifying agents may be added during the polymerization reaction.

We claim:

1. A process for polymerizing an ethylenically unsaturated polymerizable compound at elevated temperatures wherein the polymerization catalyst comprises an N-substituted-benzosulfotriazine of the formula

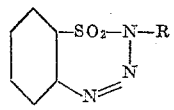

wherein R is selected from the group consisting of alkyl radicals of from 1 to 6 carbon atoms, aryl radicals of from 6 to 12 carbon atoms, aralkyl radicals, cycloalkyl radicals and chloro- and hydroxy-derivatives of such radicals.

2. A process for polymerizing a compound of the general formula

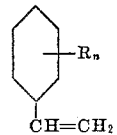

wherein R is a lower alkyl radical of from 1 to 2 carbon atoms and $n$ is an integer of from 0 to 2, at elevated temperatures wherein the polymerization catalyst comprises an N-substituted-benzosulfotriazine of the formula

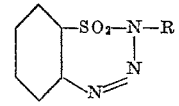

wherein R is selected from the group consisting of alkyl radicals of from 1 to 6 carbon atoms, aryl radicals of from 6 to 12 carbon atoms, aralkyl radicals, cycloalkyl radicals and chloro- and hydoxy-derivatives of such radicals.

3. A process for polymerizing acrylonitrile and a compound of the general formula

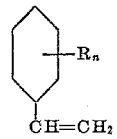

wherein R is a lower alkyl radical of from 1 to 2 carbon atoms and $n$ is an integer of from 0 to 2, at elevated temperatures wherein the polymerization catalyst comprises an N-substituted-benzosulfotriazine of the formula

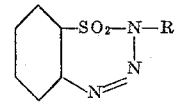

wherein R is selected from the group consisting of alkyl radicals of from 1 to 6 carbon atoms, aryl radicals of from 6 to 12 carbon atoms, aralkyl radicals, cycloalkyl radicals and chloro- and hydroxy-derivatives of such radicals.

4. A process for polymerizing acrylonitrile at elevated temperatures wherein the polymerization catalyst comprises an N-substituted-benzosulfotriazine of the formula

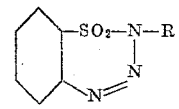

wherein R is selected from the group consisting of alkyl radicals of from 1 to 6 carbon atoms, aryl radicals of from 6 to 12 carbon atoms, aralkyl radicals, cycloalkyl radicals and chloro- and hydroxy-derivatives of such radicals.

5. A process for polymerizing styrene at elevated temperatures wherein the polymerization catalyst comprises an N-substituted-benzosulfotriazine of the formula

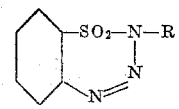

wherein R is selected from the group consisting of alkyl radicals of from 1 to 6 carbon atoms, aryl radicals of from 6 to 12 carbon atoms, aralkyl radicals, cycloalkyl radicals and chloro- and hydroxy-derivatives of such radicals.

6. A process for polymerizing an ethylenically unsaturated polymerizable compound at elevated temperatures wherein the polymerization catalyst comprises N-methylbenzosulfotriazine.

7. A process for polymerizing a compound of the general formula

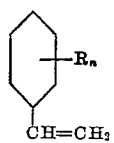

wherein R is a lower alkyl radical of from 1 to 2 carbon atoms and *n* is an integer of from 0 to 2, at elevated temperatures wherein the polymerization catalyst comprises N-methylbzenosulfotriazine.

8. A process for polymerizing acrylonitrile and a compound of the general formula

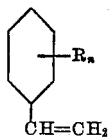

wherein R is a lower alkyl radical of from 1 to 2 carbon atoms and *n* is an integer of from 0 to 2, at elevated temperatures wherein the polymerization catalyst comprises N-methylbenzosulfotriazine.

9. A process for polymerizing acrylonitrile at elevated temperatures wherein the polymerization catalyst comprises N-methylbenzosulfotriazine.

10. A process for polymerizing styrene at elevated temperatures wherein the polymerization catalyst comprises N-methylbenzosulfotriazine.

11. A process for polymerizing an ethylenically unsaturated polymerizable compound at elevated temperature wherein the polymerization catalyst comprises N-phenylbenzosulfotriazine.

12. A process for polymerizing a compound of the general formula

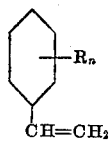

wherein R is a lower alkyl radical of from 1 to 2 carbon atoms and *n* is an integer of from 0 to 2, at elevated temperatures wherein the polymerization catalyst comprises N-phenylbenzosulfotriazine.

13. A process for polymerizing acrylonitrile and a compound of the general formula

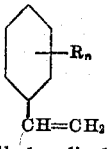

wherein R is a lower alkyl radical of from 1 to 2 carbon atoms and *n* is an integer of from 0 to 2, at elevated temperatures wherein the polymerization catalyst comprises N-phenylbenzosulfotriazine.

14. A process for polymerizing acrylonitrile at elevated temperatures wherein the polymerization catalyst comprises N-phenylbenzosulfotriazine.

15. A process for polymerizing styrene at elevated temperatures wherein the polymerization catalyst comprises N-phenylbenzosulfotriazine.

References Cited in the file of this patent

UNITED STATES PATENTS

| | | |
|---|---|---|
| 2,376,015 | Semon | May 15, 1945 |
| 2,527,393 | Brown | Oct. 24, 1950 |